United States Patent Office 3,013,009
Patented Dec. 12, 1961

3,013,009
OPTIONALLY 17-ALKYLATED AND 7-OXYGENATED ANDROST(AN AND 5-EN)-3-OL AMINOALKYL ESTERS AND ETHERS
Charles W. Marshall, Skokie, Ill., assignor to G. D. Searle & Co., Chicago, Ill., a corporation of Delaware
No Drawing. Filed Apr. 10, 1959, Ser. No. 805,381
16 Claims. (Cl. 260—239.5)

This invention relates to optionally 17-alkylated and 7-oxygenated androst(an and 5-en)-3-ol aminoalkyl esters and ethers, and processes for the manufacture thereof. More particularly, this invention relates to compounds of the formula

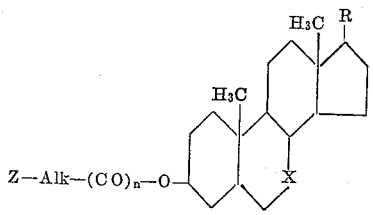

wherein R represents hydrogen or an alkyl radical, X represents a methylene (—CH$_2$—) or carbonyl (—CO—) radical, Alk represents an alkylene radical, Z represents an optionally alkylated amino radical, and $n$ represents 0 or the positive integer 1. Additionally, this invention relates to compounds identical with those hereinabove enformulated except that there is a double bond in the 5(6) position. Those skilled in the art will readily appreciate that when $n$ in the foregoing formula is 0, the described compounds are ethers, since the carbonyl constituent of the aminoalkyl side-chain drops out; otherwise (when $n$ is 1) the compounds set forth are esters.

Among the alkyl radicals contemplated by R in the above formula, particularly lower alkyl groupings are preferred, for example, methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_sH_{2s+1}$ radicals wherein $s$ is a positive integer amounting to less than 9.

The alkylene radicals comprehended by Alk in the formula are preferably of lower order also and, accordingly, will be understood to consist of bivalent saturated acyclic straight- or branched-chain hydrocarbon groupings of empirical formula, —$C_mH_{2m}$—, wherein $m$ is a small positive integer greater than 1. Examples of such radicals are:

1,2-ethylene (—CH$_2$CH$_2$—)

Trimethylene (—CH$_2$CH$_2$CH$_2$—)

1,2-propylene

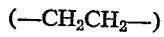

Tetramethylene (—CH$_2$CH$_2$CH$_2$CH$_2$—)

2-methyl-1,2-propylene

2,4-pentylene

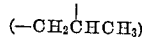

2,2-dimethyl-1,3-propylene

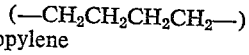

3-methyl-1,4-butylene

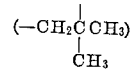

Hexamethylene (—CH$_2$CH$_2$CH$_2$CH$_2$CH$_2$—)

etc.

Z in the generic formula for compounds of this invention subsumes both the amino radical, —NH$_2$, and the amino radical as modified by introduction of 1 or 2 alkyl or hydroxyalkyl radicals—especially lower alkyl and hydroxy(lower alkyl) radicals. In the latter circumstance, the alkyl and hydroxyalkyl groupings present may be either discrete, as when for example Z designates a radical of the formula

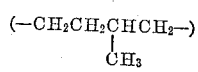

or they may be joined together directly or through oxygen or a second nitrogen to compose cyclic amino radicals optimally comprising at least 4 and not more than 7 carbon atoms. Illustrative of the cyclic amino radicals comtemplated by Z are pyrrolidinyl, 2-methylpyrrolidinyl, 2,5-dimethylpyrrolidinyl, 3 - methyl-4-ethylpyrrolidinyl, piperidinyl, 3-methylpiperidinyl, 2,6-dimethylpiperidinyl, morpholinyl, piperazinyl, 4-methylpiperazinyl, 4-hydroxyethylpiperazinyl, and like monovalent 5- and 6-membered heterocyclic groupings.

Equivalent to the hereinabove-described amines for purposes of the present invention are their non-toxic acid addition salts, the composition of which is depicted by

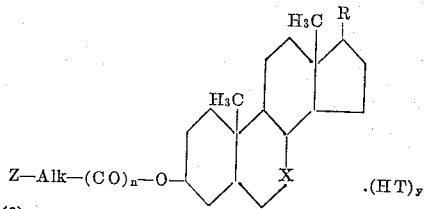

and Δ$^{5(6)}$ compounds corresponding, wherein R, X, Alk, Z, and $n$ have the meanings previously assigned; T is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $y$ is 1 except where Z comprises a piperazinyl radical, in which case $y$ is either 1 or 2.

The compounds to which this invention relates are useful because of their valuable pharmacological properties. For example, they are tranquilizing, eurhythmic, anticonvulsant, and anti-hypertensive agents; and particularly the 3-ethers hereof appear to be characterized by an unusually prolonged duration of activity. They are, moreover, not only parenterally but orally effective.

Manufacture of the Δ$^{5(6)}$ compounds hereof proceeds by interaction of an appropriate steroidal intermediate

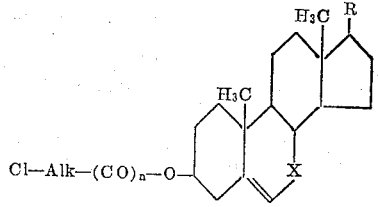

with a selected amine

Z—H preferably in the presence of an inert solvent and using an alkaline catalyst such as sodium iodide to promote reactivity. The corresponding 5(6)-saturated analogs, in turn, are derived from the Δ⁵⁽⁶⁾ compounds by low pressure hydrogenation in acetic acid or like solvent, with platinum oxide or the equivalent as catalyst. Conversion of the amine bases of this invention to corresponding acid addition salts is accomplished by simple admixture of these compounds with either 1 or 2 equivalents of any of various inorganic and strong organic acids, the anionic portion of which conforms to Z as hereinabove defined.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in pounds per square inch (p.s.i.), and relative amounts of materials in parts by weight, except as otherwise noted.

*Example 1*

A. *3β-(3-chloropropionyloxy)pregn-5-ene.*—To an anhydrous solution of approximately 13 parts of pregn-5-en-3β-ol in 540 parts of benzene at 35° is added, with agitation, approximately 13 parts of 3-chloropropionyl chloride, followed by approximately 13 parts of 2,4,6-trimethylpyridine. The resultant mixture is maintained at 30–35° for 1 hour, then at room temperatures for 2 hours, agitation being continued the while. Precipitation of 2,4,6-trimethylpyridine hydrochloride begins almost at once, and is completed at the close of the heating period by mixing in approximately 840 parts of anhydrous ether. The precipitate is removed by filtration; and the filtrate is washed consecutively with dilute hydrochloric acid, dilute aqueous sodium carbonate, water, and brine, following which the solvent is removed by vacuum distillation. The residue is 3β-(3-chloropropionyloxy)-pregn-5-ene, which is characterized by principal bands in the infrared spectrum at 5.77 ,7.95, and 8.22–8.36μ (determined in chloroform solution).

B. *3β-[3-(1-pyrrolidinyl)propionyloxy]pregn-5-ene hydrochloride.*—To an anhydrous solution of 23 parts of 3β-(3-chloropropionyloxy)pregn-5-ene in 1200 parts of acetone at 40° is added, with agitation, approximately 7 parts of pyrrolidine and 13 parts of sodium iodide. The resultant mixture is maintained at 35–40° for 1½ hours, then allowed to cool to room temperatures over 1½ hours, agitation being continued the while. Precipitation of sodium chloride occurs in process. At the end of the prescribed 3 hours, acetone is removed by vacuum distillation; and the slushy residue is mixed with 1000 parts of cold aqueous 5% sodium bicarbonate. The resultant mixture is extracted with ether. The ether extract is successively washed with dilute aqueous sodium carbonate, water, and brine; dried over anhydrous sodium sulfate; and stripped of solvent by evaporation. The brown oil thus obtained contains a small amount of unreacted pyrrolidine, which is removed by vacuum distillation. The residue is taken up in 700 parts of anhydrous ether, and to the ether solution is added a slight excess (representatively, 2 parts) of hydrogen chloride dissolved in approximately 7 parts of 2-propanol. The yellow precipitate thrown down is 3β-[3-(1-pyrrolidinyl)propionyloxy]-pregn-5-ene hydrochloride which, recrystallized from absolute ethanol, is obtained as a colorless product melting at 218–220° (uncorr.). The product has the formula

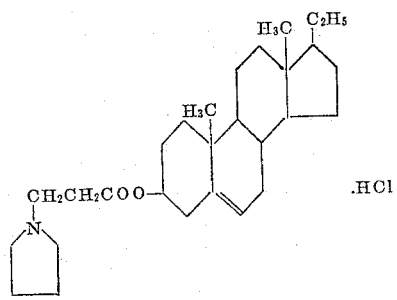

C. *3β-[3-(1-pyrrolidinyl)propionyloxy]pregn-5-ene.*—A suspension of approximately 23 parts of 3β-[3-(1-pyrrolidinyl)propionyloxy]pregn-5-ene hydrochloride in 1000 parts of water is thoroughly mixed with an excess (representatively, 2000 parts) of aqueous 5% sodium bicarbonate. The resultant mixture is extracted with ether. The ether extract is successively washed with dilute aqueous sodium carbonate, water, and brine; dried over anhydrous sodium sulfate; and stripped of solvent by evaporation. The residue is the free base, 3β-[3-(1-pyrrolidinyl)propionyloxy]pregn-5-ene, characterized by principal bands in the infrared spectrum at 5.77, 7.98, and 8.30μ (determined in a potassium bromide disc).

*Example 2*

A. *3β - (3 - chloropropionyloxy)pregn-5-en-7-one.*—Using the procedure of Example 1A, 20 parts of 3β-hydroxy-pregn-5-en-7-one [preparable by the procedure of Rapala and Farkas, J. Amer. Chem. Soc. 77, 6685 (1955)], 16 parts of 3-chloropropionyl chloride, and 13 parts of 2,4,6-dimethylpyridine in 560 parts of benzene affords 3β-(3-chloropropionyloxy)pregn-5-en-7-one, which is characterized by principal bands in the infrared spectrum at 5.76, 5.99, 6.15, 8.24, and 8.40μ (determined in chloroform solution). The ultraviolet spectrum is characterized by a maximum absorption at 235 μ, with a molar extinction coefficient of 13600 (in methanol solution).

B. *3β - [3-(1-pyrrolidinyl)propionyloxy]pregn-5-en-7-one hydrochloride.*—Substitution of approximately 21 parts of 3β-(3-chloropropionyloxy)pregn-5-en-7-one for the 23 parts of 3β-(3-chloropropionyloxy)pregn-5-ene called for in Example 1B affords, by the procedure there detailed, 3β-[3-(1-pyrrolidinyl)propionyloxy]pregn-5-en-7-one hydrochloride. The colorless product is dimorphic, occurring as needles or platelets, and melts at approximately 194–195°. It has the formula

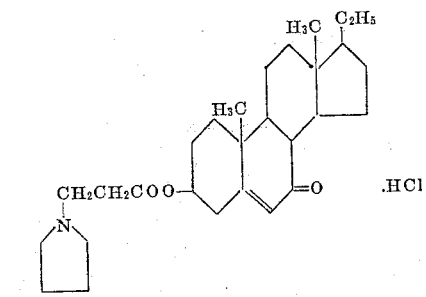

C. *3β - [3-(1-pyrrolidinyl)propionyloxy]pregn-5-en-7-one.*—Conversion of the acid addition salt of the preceding part B of this example to the free base is accomplished by alkalization of an aqueous suspension with sodium bicarbonate, extraction into ether, washing, and evaporation of solvent as detailed in Example 1C. 3β-[3-(1-pyrrolidinyl)propionyloxy]pregn-5-en-7-one is characterized by principal bands in the infrared spectrum at 5.77, 5.98, 6.12, and 8.25–8.40μ (determined in a potassium bromide disc).

*Example 3*

A. *3β-(3-chloropropionyloxy)cholest - 5 - ene.*—Using the procedure of Example 1A, 20 parts of cholesterol, 13 parts of 3-chloropropionyl chloride, and 13 parts of 2,4,6-trimethylpyridine in 540 parts of benzene affords 3β-(3-chloropropionyloxy)cholest-5-ene, which is characterized by principal bands in the infrared spectrum at 5.76, 7.94, and 8.20–8.35μ (determined in chloroform solution).

B. *3β - [3-(1-pyrrolidinyl)propionyloxy]cholest-5-ene hydrochloride.*—Substitution of 23 parts of 3β-(3-chloropropionyloxy)cholest-5-ene for the 23 parts of 3β-(3-chloropropionyloxy)pregn-5-ene called for in Example 1B affords, by the procedure there detailed, 3β-[3-(1-pyrrolidinyl)propionyloxy]cholest-5-ene hydrochloride. The colorless product melts at 211–213° (uncorr.) and has the formula

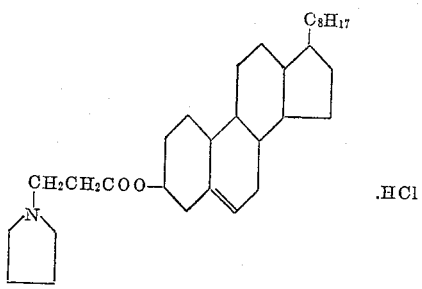

C. *3β - [3 - (1-pyrrolidinyl)propionyloxy]cholest-5-ene.*—Conversion of the acid addition salt of the preceding part B of this example to the free base is accomplished by alkalization of an aqueous suspension with sodium bicarbonate, extraction with ether, washing, and evaporation of solvent as detailed in Example 1C. 3β-[3-(1-pyrrolidinyl)propionyloxy]cholest-5-ene is characterized by principal bands in the infrared spectrum at 5.77 and 8.20μ (determined in a potassium bromide disc).

*Example 4*

A. *3β - (p - tolylsulfonyloxy)pregn - 5 - ene.*—Using the procedure of Stoll, Z. physiol. Chemie, 207, 147 (1932), 30 parts of pregn-5-en-3β-ol is esterified with 30 parts of p-tolylsulfonyl chloride in 300 parts of pyridine. The 3β-(p-tolylsulfonyloxy)pregn-5-ene so produced, recrystallized from a mixture of acetone and ether, is obtained as tiny needles melting at 135–136°.

B. *3β-(3-chloropropoxy)pregn-5-ene.*—To a solution of 150 parts of 3β-(p-tolylsulfonyloxy)pregn-5-ene in approximately 500 parts of benzene is added, with agitation under a nitrogen atmosphere at 70–80°, 316 parts of 3-chloropropanol. Agitation is maintained under nitrogen at the prescribed temperatures for 1½ hours, following which 1750 parts of ether is introduced and the resultant solution is successively washed with aqueous sodium carbonate, water, and brine. The solution is then dried over anhydrous sodium sulfate and concentrated to approximately 1/10 its original volume by vacuum distillation. The warm concentrate is diluted with approximately 960 parts of warm acetone and then chilled. The desired 3β-(3-chloropropoxy)pregn-5-ene crystallizes as fine white needles melting at approximately 99.0–99.5°. The product is further characterized by a specific rotation of −40° (in chloroform solution).

C. *3β-(3-dimethylaminopropoxy)pregn-5-ene hydrochloride.*—To an anhydrous mixture of 9 parts of 3β-(3-chloropropoxy)pregn-5-ene and approximately 7 parts of sodium iodide in 200 parts of butanone at −10° is added an ice-cold solution of 7 parts of dimethylamine in 20 parts of toluene. The resultant mixture is heated in a sealed vessel at 60–65° for 42 hours, then stripped of solvent by vacuum distillation. The warm sirupy residue is thoroughly mixed with 500 parts of cold aqueous 5% sodium carbonate, following which the mixture is cooled to approximately 5° and maintained thereat for several hours. Precipitated solids are removed by filtration and taken up in ether. The ether solution is successively washed with dilute aqueous sodium carbonate, water, and brine; dried over anhydrous sodium sulfate; and diluted with 1 part of hydrogen chloride dissolved in 3 parts of 2-propanol. The precipitate thrown down is collected on a filter, washed thereon with ether, and dried in vacuo. The white powder so produced is 3β-(3-dimethylaminopropoxy)pregn-5-ene hydrochloride which, crystallized from absolute ethanol, is obtained as slender flat blades melting at 215–216°. The product has the formula

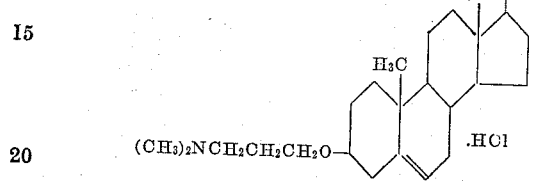

D. *3β-(3-dimethylaminopropoxy)pregn-5-ene.*—A suspension of 40 parts of 3β-(3-dimethylaminopropoxy)pregn-5-ene hydrochloride in 1000 parts of aqueous 5% sodium carbonate is vigorously agitated for 15 minutes and then extracted with ether. The ether extract is successively washed with dilute aqueous sodium carbonate, water, and brine; dried over anhydrous sodium sulfate; and stripped of solvent by evaporation. The residue is the desired free base, 3β-(3-dimethylaminopropoxy)pregn-5-ene.

*Example 5*

A. *3β-(3-dimethylaminopropoxy)pregn-5-ene hydrochloride.*—A mixture of 10 parts of 3β-(3-chloropropoxy)pregn-5-ene, approximately 6 parts of diethylamine, and approximately 7 parts of sodium iodide in 240 parts of acetone is heated in a sealed vessel at 60–65° for 24 hours. Solvent is then removed by vacuum distillation; and the warm sirupy residue is thoroughly mixed with 500 parts of cold aqueous 5% sodium carbonate. The resultant mixture is cooled to approximately 5° and maintained thereat for several hours. Precipitated solids are removed by filtration and taken up in ether. The ether solution is successively washed with dilute aqueous sodium carbonate, water, and brine; dried over anhydrous sodium sulfate; and diluted with 1 part of hydrogen chloride dissolved in 3 parts of 2-propanol. The precipitate thrown down is collected on a filter, washed thereon with ether, and dried in vacuo. The white powder thus obtained is 3β-(3-diethylaminopropoxy)pregn-5-ene hydrochloride which, crystallized from absolute ethanol, melts at approximately 201–202°. The product has the formula

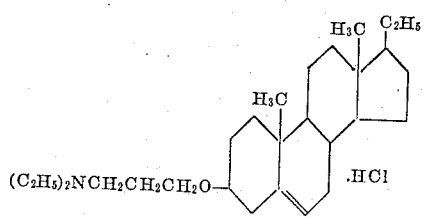

B. *3β-(3-dimethylaminopropoxy)pregn-5-ene.*—Conversion of the acid addition salt of the preceding part A of this example to 3β-(3-diethylaminopropoxy)pregn-5-ene is accomplished by alkalization of an aqueous suspension with sodium carbonate, extraction into ether, washing, and evaporation of solvent as detailed in Example 4D.

*Example 6*

A. *3β-(3-chloropropoxy)cholest-5-ene.*—A solution of 32 parts of 3β-(p-tolylsulfonyloxy)cholest-5-ene in 170 parts of 3-chloropropanol is heated at 65–75° for 1½ hours under nitrogen. The solution is then cooled and thoroughly mixed with 450 parts of cold water. The granular precipitate which forms is collected on a filter, washed thereon with water, and dried in air. The light yellow solid thus obtained is recrystallized from acetone to give colorless clusters of massive needles melting at approximately 83–84°, and with a specific rotation in chloroform solution of −29°. This material is 3β-(3-chloropropoxy)cholest-5-ene.

B. *3β-(3-diethylaminopropoxy)cholest-5-ene hydrochloride.*—A mixture of 8 parts of 3β-(3-chloropropoxy)-cholest-5-ene, approximately 5 parts of diethylamine, and approximately 6 parts of sodium iodide in 200 parts of acetone is heated in a sealed vessel at 60–65° for 30 hours. Solvent is then removed by vacuum distillation; and the warm sirupy residue is thoroughly mixed with 500 parts of cold aqueous 5% sodium carbonate. The resultant mixture is cooled to approximately 5° and maintained thereat for several hours. Precipitated solids are removed by filtration and taken up in ether. The ether solution is successively washed with dilute aqueous sodium carbonate, water, and brine; dried over anhydrous sodium sulfate; and diluted with 1 part of hydrogen chloride dissolved in 3 parts of 2-propanol. The precipitate thrown down is collected on a filter, washed thereon with ether, and dried in vacuo. The material thus obtained is 3β-(3-diethylaminopropoxy)cholest-5-ene hydrochloride, which is characterized by principal bands in the infrared spectrum at 3.82, 4.12, 7.25, 7.35, 9.01, 9.47, and 9.75μ (determined in a potassium bromide disc). The product has the formula

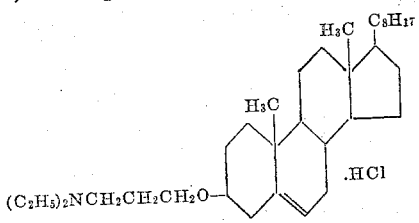

C. *3β-(3-diethylaminopropoxy)cholest-5-ene.*—A suspension of 30 parts of 3β-(3-diethylaminopropoxy)-cholest-5-ene hydrochloride in 750 parts of aqueous 5% sodium carbonate is vigorously agitated for 15 minutes and then extracted with ether. The ether extract is successively washed with dilute aqueous sodium carbonate, water, and brine; dried over anhydrous sodium sulfate; and stripped of solvent by evaporation. The residue is the desired free base, 3β-(3-diethylaminopropoxy)cholest-5-ene.

*Example 7*

A. *3β-(2-chloroethoxy)pregn-5-ene.*—A solution of 35 parts of 3β-(p-tolylsulfonyloxy)pregn-5-ene in approximately 150 parts of 2-chloroethanol is heated with agitation at 75–78° for 1½ hours. The solution is then cooled and diluted with approximately 500 parts of ether. The resultant solution is successively washed with aqueous sodium carbonate, water, and brine, following which it is dried over anhydrous sodium sulfate and finally stripped of solvent by vacuum distillation. The residue is taken up in hexane and chromatographed on silica gel, using hexane and benzene as developing solvents. There is isolated by this means pure 3β-(2-chloroethoxy)pregn-5-ene, which is characterized by principal bands in the infrared spectrum at 7.50, 8.28, 9.04, 9.30, 9.51, 9.68, 9.82, and 10.45μ (determined in a potassium bromide disc).

B. *3β-[2-(1-pyrrolidinyl)ethoxy]pregn-5-ene hydrochloride.*—To a solution of 21 parts of 3β-(2-chloroethoxy)pregn-5-ene in 560 parts of dry redistilled acetone under a nitrogen atmosphere is added 9 parts of pyrrolidine and 15 parts of sodium iodide. The resultant mixture is heated at the boiling point under reflux with agitation for 24 hours, then concentrated to approximately ⅓ its volume by distillation. The warm concentrate is poured, with vigorous agitation, into approximately 2000 parts of cold aqueous 5% sodium carbonate; and the mixture thus obtained is maintained at 5–10° for approximately 4 hours. Solids are then filtered off and dissolved in ether. The ether solution is consecutively washed with dilute aqueous sodium bicarbonate, water, and brine; dried over anhydrous sodium sulfate; and stripped of solvent by vacuum distillation. The residue is taken up in absolute ether; and to this ether solution, with agitation, is slowly added a slight excess (representatively, 2 parts) of hydrogen chloride dissolved in 7 parts of 2-propanol. The yellow precipitate thrown down is collected on a filter, washed thereon with ether, and dried in vacuo. Recrystallization from absolute ethanol affords the desired 3β-[2-(1-pyrrolidinyl)ethoxy]-pregn-5-ene hydrochloride as a substantially colorless product melting at 197–198.5°. The product is stable at room temperatures for only a few days, slowly losing hydrogen chloride on storage. The product has the formula

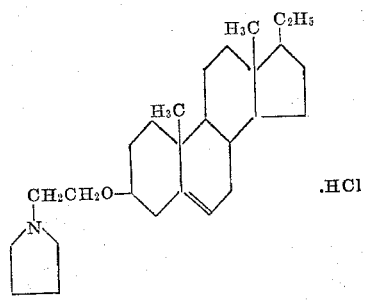

C. *3β-[2-(1-pyrrolidinyl)ethoxy]pregn-5-ene.*—A suspension of 4 parts of 3β-[2-(1-pyrrolidinyl)ethoxy]-pregn-5-ene hydrochloride in 100 parts of aqueous 5% sodium carbonate is vigorously agitated for 15 minutes and then extracted with ether. The ether extract is successively washed with dilute aqueous sodium carbonate, water, and brine; dried over anhydrous sodium sulfate; and stripped of solvent by evaporation. The residue is the desired free base, 3β-[2-(1-pyrrolidinyl)ethoxy]pregn-5-ene.

*Example 8*

A. *3β-[3-(1-pyrrolidinyl)propoxy]pregn-5-ene hydrochloride.*—Using the procedure of Example 7B, 19 parts of 3β-(3-chloropropoxy)pregn-5-ene, approximately 8 parts of pyrrolidine, and approximately 14 parts of sodium iodide in 480 parts of dry redistilled acetone affords 3β-[3-(1-pyrrolidinyl)propoxy]pregn-5-ene hydrochloride, which crystallizes from absolute ethanol as needles melting at approximately 210–211°. The product has the formula

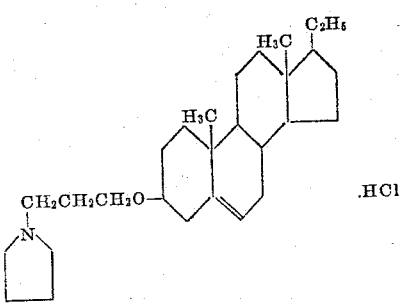

B. *3β-[3-(1-pyrrolidinyl)propoxy]pregn-5-ene.*—Conversion of the acid addition salt of the preceding part A of this example to the free base is accomplished by mixing with aqueous 5% sodium carbonate, extraction into ether, washing, and evaporation of solvent as detailed in Example 4D. Crystallization of the base from acetone affords the desired 3β-[3-(1-pyrrolidinyl)-propoxy]pregn-5-ene as slender flat blades melting at approximately 108–108.5°. The product has a specific rotation of −40° (in chloroform solution).

Example 9

A. *3β-(3-chloropropoxy)androst-5-ene.*—Substitution of approximately 36 parts of 3β-(p-tolylsulfonyloxy)-androst-5-ene for the 32 parts of 3β-(p-tolylsulfonyloxy)-cholest-5-ene called for in Example 6A affords, by the procedure there detailed, 3β-(3-chloropropoxy)androst-5-ene which, crystallized from a mixture of acetone and methanol, melts at approximately 78–79°.

B. *3β-[3-(1-pyrrolidinyl)propoxy]androst-5-ene hydrochloride.*—Substitution of 17 parts of 3β-(3-chloropropoxy)androst-5-ene for the 21 parts of 3β-(2-chloroethoxy)pregn-5-ene called for in Example 7B affords, by the procedure there detailed, 3β-[3-(1-pyrrolidinyl)propoxy]androst-5-ene hydrochloride. The product melts at 226–230° and has the formula

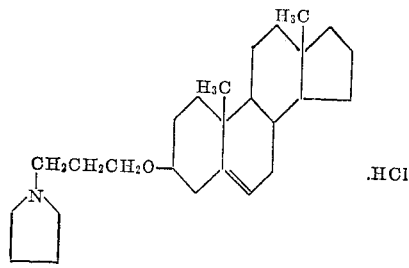

C. *3β-[3-(1-pyrrolidinyl)propoxy]androst-5-ene.*—Conversion of the acid addition salt of the preceding part B of this example to the free base is accomplished by mixing with an excess of aqueous sodium carbonate, extraction into ether, washing, and evaporation of solvent as detailed in Example 6C.

Example 10

A. *17β-methyl-3β-(p-tolylsulfonyloxy)androst-5-ene.*—Substitution of 28 parts of 17β-methylandrost-5-en-3β-ol [preparable by saponification of the 3-acetate obtained on oxidation of 3β-acetoxypregn-5-ene according to the technique of Fieser et al., J. Amer. Chem. Soc., 71, 2226 (1949)] for the 30 parts of pregn-5-en-3β-ol called for in Example 4A affords, by the procedure there detailed, 17β-methyl-3β-(p-tolylsulfonyloxy)androst-5-ene, which melts at approximately 126–127°.

B. *3β-(3-chloropropoxy)-17β-methylandrost-5-ene.*—A solution of 20 parts of 17β-methyl-3β-(p-tolylsulfonyloxy)-androst-5-ene in approximately 115 parts of 3-chloropropanol is heated at 65–75° for 1½ hours under nitrogen. The solution is then cooled and thoroughly mixed with 450 parts of cold water. The granular precipitate which forms is collected on a filter, washed thereon with water and dried in air. The product thus obtained is the desired 3β-(3-chloropropoxy)-17β-methylandrost-5-ene.

C. *17β-methyl-3β-[3-(1-pyrrolidinyl)propoxy]androst-5-ene hydrochloride.*—Using the procedure of Example 7B, 16 parts of 3β-(3-chloropropoxy)-17β-methylandrost-5-ene, 9 parts of pyrrolidine, 15 parts of sodium iodide, and 560 parts of dry redistilled acetone affords 17β-methyl-3β-[3-(1-pyrrolidinyl)propoxy]androst-5-ene hydrochloride which, crystallized from absolute ethanol, melts at 214–216°. The product has the formula

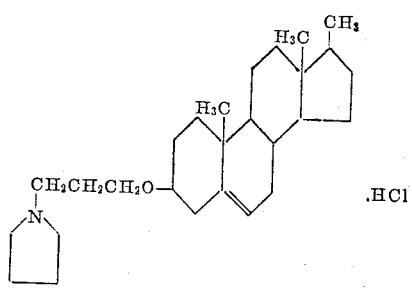

D. *17β-methyl-3β-[3-(1-pyrrolidinyl)propoxy]androst-5-ene.*—Conversion of the acid addition salt of the preceding part C of this example to 17β-methyl-3β-[3-(1-pyrrolidinyl)propoxy]androst-5-ene is accomplished by mixing with an excess of aqueous 5% sodium carbonate, extraction into ether, washing and evaporation of solvent as detailed in Example 4D.

Example 11

A. *3β-[3-(1-pyrrolidinyl)propoxy]cholest-5-ene hydrochloride.*—Using the procedure of Example 7B, 16 parts of 3β-(3-chloropropoxy)cholest-5-ene, 9 parts of pyrrolidine, 15 parts of sodium iodide, and 400 parts of dry redistilled acetone affords 3β-[3-(1-pyrrolidinyl)-propoxy]cholest-5-ene hydrochloride which, recrystallized from absolute ethanol, is obtained as long silky needles melting at 205–207°. The product has the formula

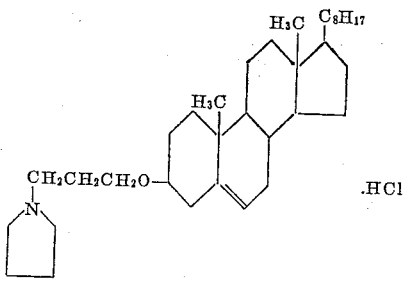

B. *3β-[3-(1-pyrrolidinyl)propoxy]cholest-5-ene.*—Conversion of this acid addition salt of the preceding part A of this example to 3β-[3-(1-pyrrolidinyl)-propoxy]cholest-5-ene is accomplished by mixing with a slight excess of aqueous 5% sodium carbonate, extraction into ether, washing, and evaporation of solvent as detailed in Example 4D.

Example 12

A. *3β-(3-piperidinopropoxy)pregn-5-ene hydrochloride.*—Using the procedure of Example 7B, 20 parts of 3β-(3-chloropropoxy)pregn-5-ene, 10 parts of piperidine, and approximately 14 parts of sodium iodide in 510 parts of dry redistilled acetone afford 3β-(3-piperidinopropoxy)pregn-5-ene hydrochloride which, crystallized from absolute ethanol, melts in the range 233–239°. The product has the formula

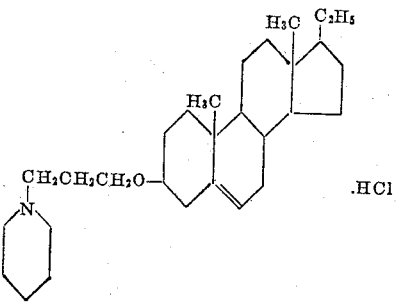

B. *3β-(3-piperidinopropoxy)pregn-5-ene.*—Conversion of the acid addition salt of the preceding part A of this example to 3β-(3-piperidinopropoxy)pregn-5-ene is accomplished by mixing with an excess of aqueous 5% sodium carbonate, extraction into ether, washing, and evaporation of solvent as detailed in Example 6C.

Example 13

A. *3β-(3-morpholinopropoxy)pregn-5-ene hydrochloride.*—Using the procedure of Example 7B, 18 parts of 3β-(3-chloropropoxy)pregn-5-ene, approximately 9 parts of morpholine, and 13 parts of sodium iodide in 480 parts of dry redistilled acetone affords 3β-(3-morpholinopropoxy)pregn-5-ene hydrochloride which, crystallized from absolute ethanol, melts in the range 210–220°. The product has the formula

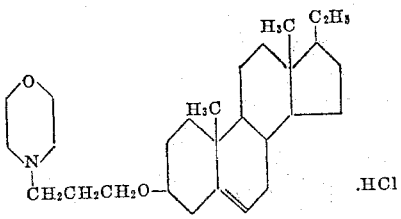

B. *3β - (3 - morpholinopropoxy)pregn - 5 - ene.*—Conversion of the acid addition salt of the preceding part A of this example to 3β-(3-morpholinopropoxy)pregn-5-ene is accomplished by mixing with an excess of aqueous 5% sodium carbonate, extraction into ether, washing, and evaporation of solvent as detailed in Example 6C.

Example 14

A. *3β- {3 - [4 - (2 - hydroxyethyl) - 1 - piperazinyl]-propoxy}pregn - 5 - ene dihydrochloride.*—To a solution of 20 parts of 3β-(3-chloropropoxy)pregn-5-ene in 560 parts of dry redistilled acetone under a nitrogen atmosphere is added 17 parts of 2-hydroxyethylpiperazine and 15 parts of sodium iodide. The resultant mixture is heated at the boiling point under reflux with agitation for 24 hours, then concentrated to approximately ¼ its volume by distillation. The warm concentrate is poured, with vigorous agitation, into approximately 2000 parts of cold aqueous 5% sodium carbonate; and the mixture thus obtained is maintained at 5–10° for approximately 4 hours. Solids are then filtered off and dissolved in ether. The ether solution is consecutively washed with dilute aqueous sodium bicarbonate, water, and brine; dried over anhydrous sodium sulfate; and stripped of solvent by vacuum distillation. The residue is taken up in absolute ether, and the ether solution is mixed into sufficient hydrogen chloride (representatively, 4 parts) dissolved in 14 parts of 2-propanol to achieve acidity. The precipitate thrown down is collected on a filter, washed thereon with ether, and dried in vacuo. Recrystallization from absolute ethanol in the presence of excess hydrogen chloride affords the desired 3β-{3-[4-(2-hydroxyethyl)-1-piperazinyl]propoxy}pregn-5-ene dihydrochloride, melting at approximately 270°. The product is sensitive to heat at temperatures considerably below this point and decomposes at temperatures as low as 180° if maintained thereat in the open air. The product has the formula

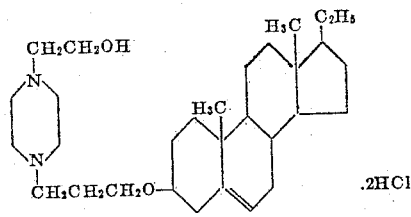

B. *3β - {3 - [4 - (2 - Hydroxyethyl) - 1 - piperazinyl]-propoxy}pregn-5-ene.*—A solution of 20 parts of 3β-{3-[4 - (2-hydroxyethyl)-1-piperazinyl]propoxy}pregn-5-ene dihydrochloride in 500 parts of aqueous 5% sodium carbonate is vigorously agitated for 20 minutes, during which time precipitation occurs. The precipitate is collected on a filter, washed thereon with water, and dried in air. Upon recrystallization from acetone, there is obtained 3β-{3-[4-(2-hydroxyethyl)-1-piperazinyl]propoxy}pregn-5-ene as short fine needles melting at approximately 106–107°. The product is further characterized by a specific rotation of −35° (in chloroform solution).

Example 15

*3β-[3-(1-pyrrolidinyl)propoxy]-5α-pregnane.*—A solution of 35 parts of 3β-[3-(1-pyrrolidinyl)propoxy]pregn-5-ene in 850 parts of glacial acetic acid is hydrogenated at room temperatures and pressures of the order of 50 p.s.i., using 1 part of platinum oxide as catalyst. When the uptake of hydrogen indicates that reduction of the 5(6) double bond is complete (representatively, after 3 hours), the catalyst is filtered off; and the filtrate is distilled in vacuo to remove the bulk of the acetic acid. The residue is taken up in 3500 parts of ether; and this solution is successively washed with dilute aqueous sodium carbonate, water, and brine; dried over anhydrous sodium sulfate; and stripped of solvent by evaporation. The residue, crystallized from acetone, affords 3β-[3-(1-pyrrolidinyl)propoxy]-5α-pregnane as short flat blades melting at approximately 78.5°. The product is further characterized by specific rotation of +12.4° (in chloroform solution). It has the formula

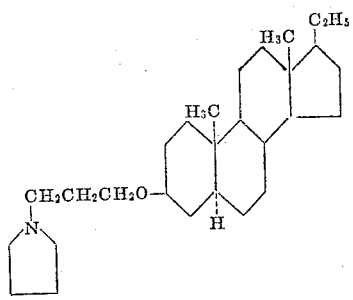

Example 16

*17β - methyl - 3β - [3 - (1 - pyrrolidinyl)propoxy]-5α-androstane.*—Substitution of 32 parts of 17β-methyl-3β-[3-(1-pyrrolidinyl)propoxy)androst-5-ene for the 35 parts 3β-[3-(1-pyrrolidinyl)propoxy]pregn-5-ene called for in Example 15 affords, by the procedure there detailed, 17β-methyl-3β-[3-(1-pyrrolidinyl)propoxy]-5α-androstane. The product has the formula

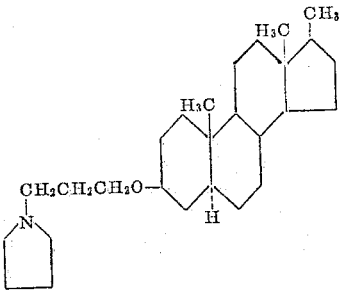

What is claimed is:
1. A compound selected from the group consisting of compounds of the formula

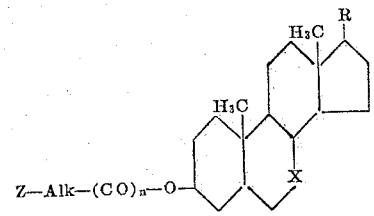

and Δ5(6) compounds corresponding thereto, R in the formula being selected from the group consisting of hydrogen and lower alkyl radicals; X in the formula being selected from the group consisting of methylene and carbonyl radicals; Alk in the formula being a lower alkylene radical; Z in the formula being selected from the group consisting of di(lower alkyl)amino and saturated cyclic amino radicals attached to alk via nitrogen, said cyclic amino radicals comprising at least 4 and not more than 6 carbon atoms and there being not more than six members in the ring; and n in the formula being selected from the group consisting of 0 and the positive integer 1.

2. A compound of the formula

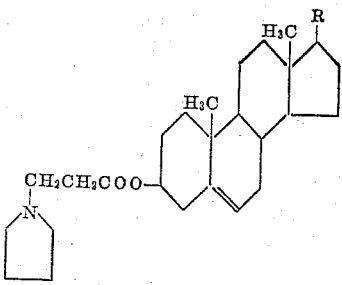

wherein R is a lower alkyl radical.
3. 3β-[3-(1-pyrrolidinyl)propionyloxy]pregn-5-ene.
4. 3β-[3 - (1 - pyrrolidinyl)propionyloxy]pregn-5-en-7-one.
5. A compound of the formula

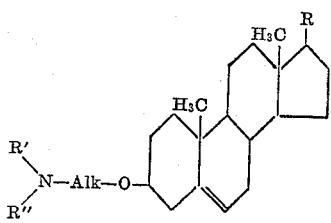

wherein R, R', and R'' are lower alkyl radicals and Alk is a lower alkylene radical.
6. A compound of the formula

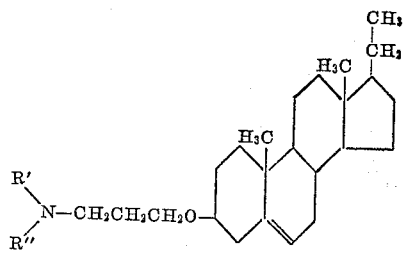

wherein R' and R'' are lower alkyl radicals.
7. 3β-(3-diethylaminopropoxy)pregn-5-ene.
8. A compound of the formula

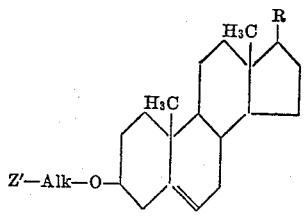

wherein R is a lower alkyl radical, Alk is a lower alkylene radical, and Z' is a saturated cyclic amino radical attached to Alk via nitrogen and comprising at least 4 and not more than 6 carbon atoms and there being not more than six members in the ring.
9. A compound of the formula

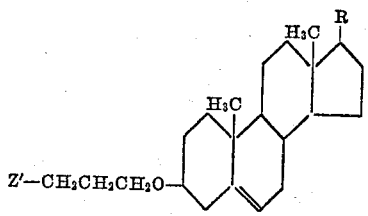

wherein R is a lower alkyl radical and Z' is a saturated cyclic amino radical attached to Alk via nitrogen and comprising at least 4 and not more than 6 carbon atoms and there being not more than six members in the ring.
10. A compound of the formula

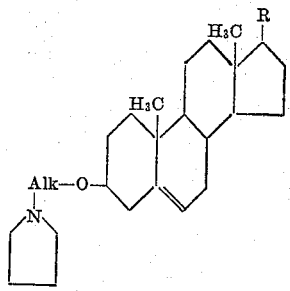

wherein R is a lower alkyl radical and Alk is a lower alkylene radical.
11. A compound of the formula

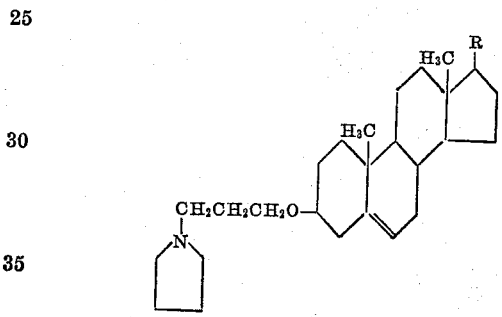

wherein R is a lower alkyl radical.
12. 3β-[3-(1-pyrrolidinyl)propoxy]pregn-5-ene.
13. 3β-(3-morpholinopropoxy)pregn-5-ene.
14. 3β - {3 - [4 - (2 - hydroxyethyl) - 1 - piperazinyl]-propoxy}pregn-5-ene.
15. A compound of the formula

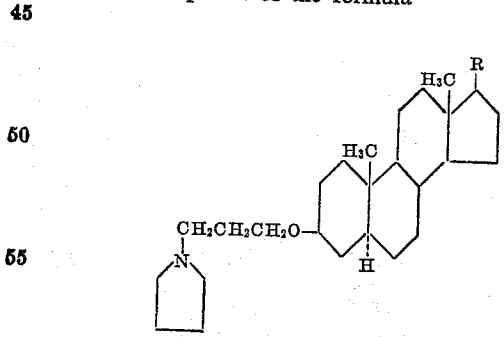

wherein R is a lower alkyl radical.
16. 3β-[3-(1-pyrrolidinyl)propoxy]-5α-pregnane.

References Cited in the file of this patent
UNITED STATES PATENTS

| | | |
|---|---|---|
| 2,023,075 | Harris | Dec. 3, 1935 |
| 2,586,438 | Rosenberg | Feb. 19, 1952 |
| 2,816,119 | Campbell et al. | Dec. 10, 1957 |
| 2,840,581 | Hogg et al. | June 24, 1958 |
| 2,885,413 | Hogg et al. | May 5, 1959 |
| 2,889,318 | Bergstrom | June 2, 1959 |

UNITED STATES PATENT OFFICE
CERTIFICATE OF CORRECTION

Patent No. 3,013,009

December 12, 1961

Charles W. Marshall

It is hereby certified that error appears in the above numbered patent requiring correction and that the said Letters Patent should read as corrected below.

Column 2, line 6, for "(-CH$_2$CH$_2$CH$_2$CH$_2$CH$_2$-)" read -- (-CH$_2$CH$_2$CH$_2$CH$_2$CH$_2$CH$_2$-) --; column 4, line 31, for "hydroxy-pregn" read -- hydroxypregn --; column 6, lines 33 and 63, for "3β-(3-dimethylaminopropoxy)pregn-5-ene", each occurrence, read -- 3β-(3-diethylaminopropoxy)pregn-5-ene --; column 9, lines 45 and 46, for "-(p-tolylsulfonyloxy)-androst-5-ene" read -- -(p-tolylsulfonyloxy)androst-5-ene --; column 10, line 32, for "this" read -- the --; column 12, line 33, after "propoxy" strike out the closing parenthesis and insert instead a closing bracket; line 70, for "alk" read -- Alk --.

Signed and sealed this 24th day of July 1962.

(SEAL)
Attest:
ERNEST W. SWIDER
Attesting Officer

DAVID L. LADD
Commissioner of Patents